Jan. 1, 1929.  1,697,345
E. CHAUDOIR
VEHICLE STORAGE BUILDING AND ELEVATOR
Filed Jan. 12, 1927   6 Sheets-Sheet 1

INVENTOR:
EUGENE CHAUDOIR

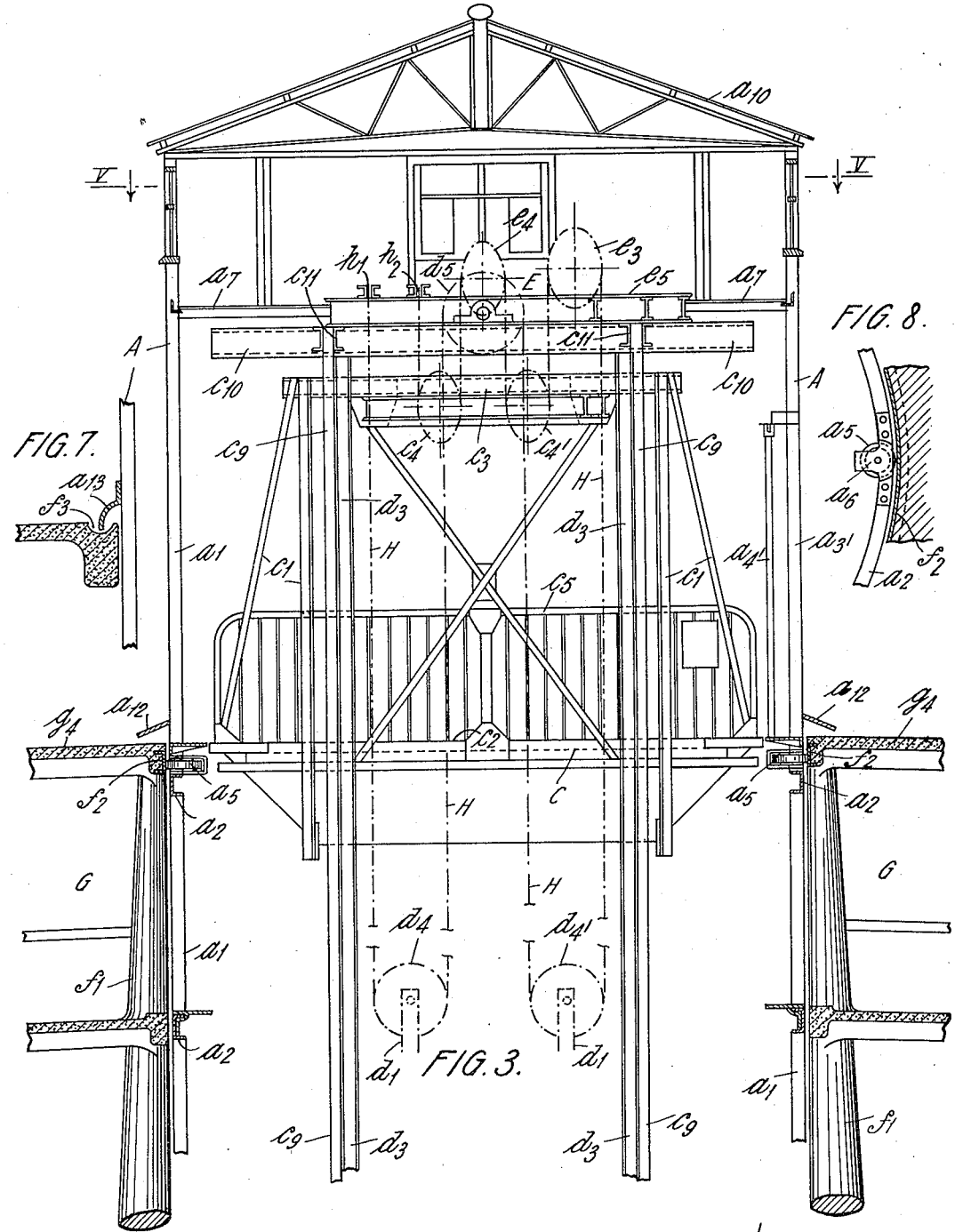

Jan. 1, 1929.
E. CHAUDOIR
1,697,345
VEHICLE STORAGE BUILDING AND ELEVATOR
Filed Jan. 12, 1927  6 Sheets-Sheet 4
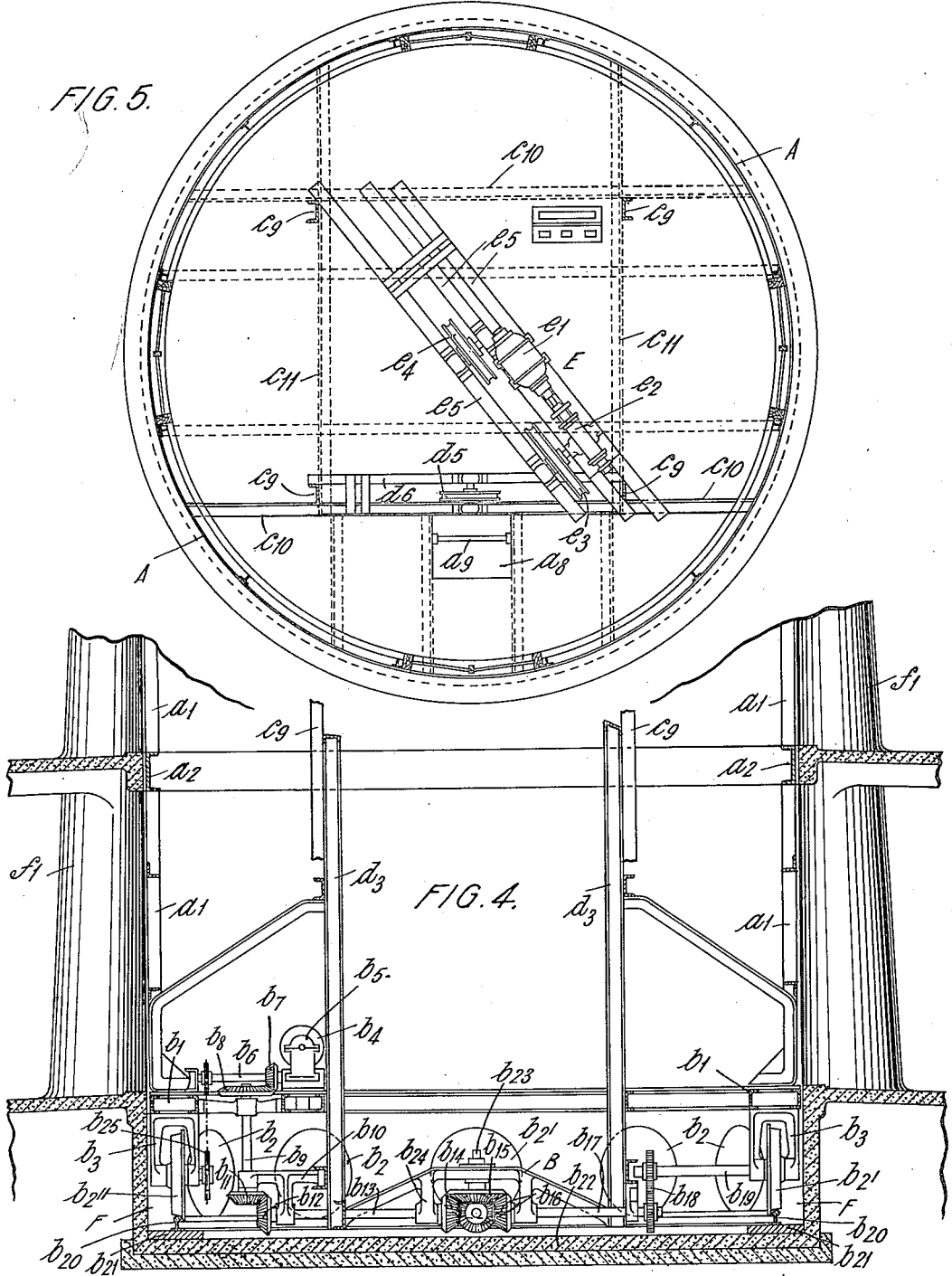
INVENTOR:
EUGENE CHAUDOIR Jan. 1, 1929.　　　　　　　　　　　　　　　　1,697,345
E. CHAUDOIR
VEHICLE STORAGE BUILDING AND ELEVATOR
Filed Jan. 12, 1927　　　6 Sheets-Sheet 6
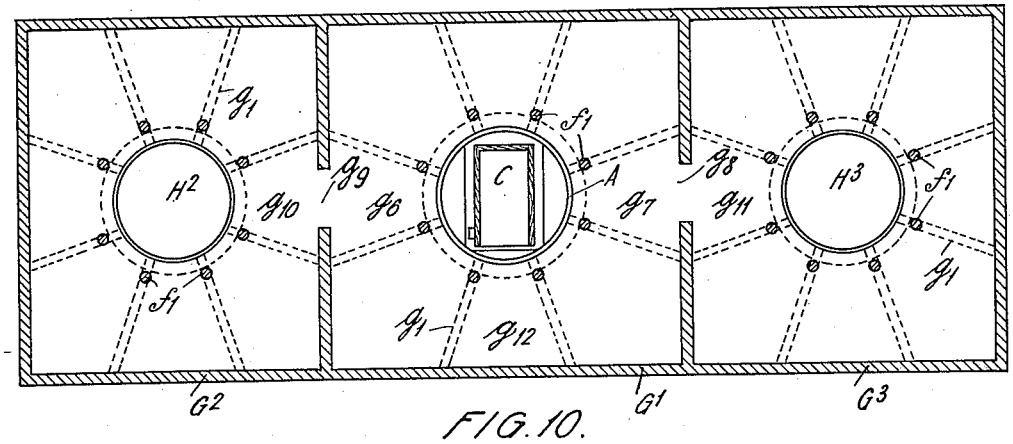
FIG. 10.
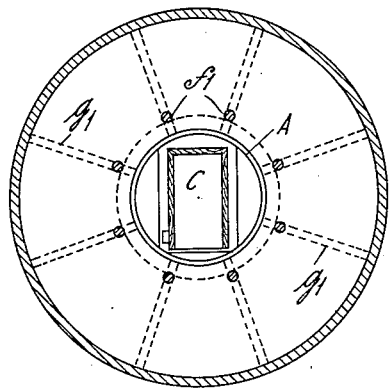
FIG. 9.
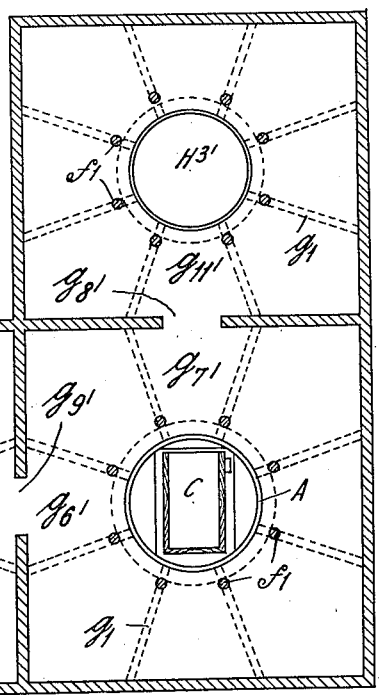
FIG. 11.
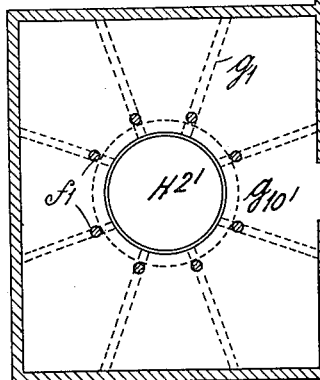
INVENTOR
EUGENE CHAUDOIR Patented Jan. 1, 1929.

1,697,345

UNITED STATES PATENT OFFICE.

EUGÈNE CHAUDOIR, OF WAVERTREE, LIVERPOOL, ENGLAND.

VEHICLE STORAGE BUILDING AND ELEVATOR.

Application filed January 12, 1927, Serial No. 160,685, and in Great Britain September 24, 1926.

This invention relates to elevators and the like vertical transporting apparatus, and to the arrangement of multiple chamber storage buildings served by such apparatus, and is specially applicable to elevators for transporting motor cars or other vehicles, goods and passengers to and fro between the ground level and the respective chambers or corridors into which each storey of a building comprising several storeys is divided, and where the entrances to the chambers or corridors on the same storey open into a common communicating well at different angles; and one of the objects of the invention is to provide an elevator by means of which such transfer can be effected rapidly, at a small cost, and, in the case of motor cars, with minimum manœvring; a further object is, whilst avoiding the necessity for providing the openings from the said chambers or corridors to a common lift well with separate gates or enclosures, to ensure the automatic closing of such openings so that the contents of each chamber are, as regards fire risk, cut off from the rest of the building; further objects will appear from what follows.

I have illustrated my invention in the accompanying drawings as applied to an elevator adapted to serve a multiple-floor garage.

Fig. 3 is a view of the upper portion of Fig. 1 to an enlarged scale, showing the cage in its uppermost position.

Fig. 4 is a view of the lower portion of Fig. 1 to an enlarged scale.

Fig. 5 is a plan view in section on the line V, V of Fig. 3.

Figs. 7 and 8 are fragmentary views showing details of construction.

Figs. 9, 10 and 11 are plan views and show diagrammatically how the turn-elevator constructed as illustrated in Figs. 1 to 10 would be applied to multiple-floor garages of different shapes.

Figure 1:
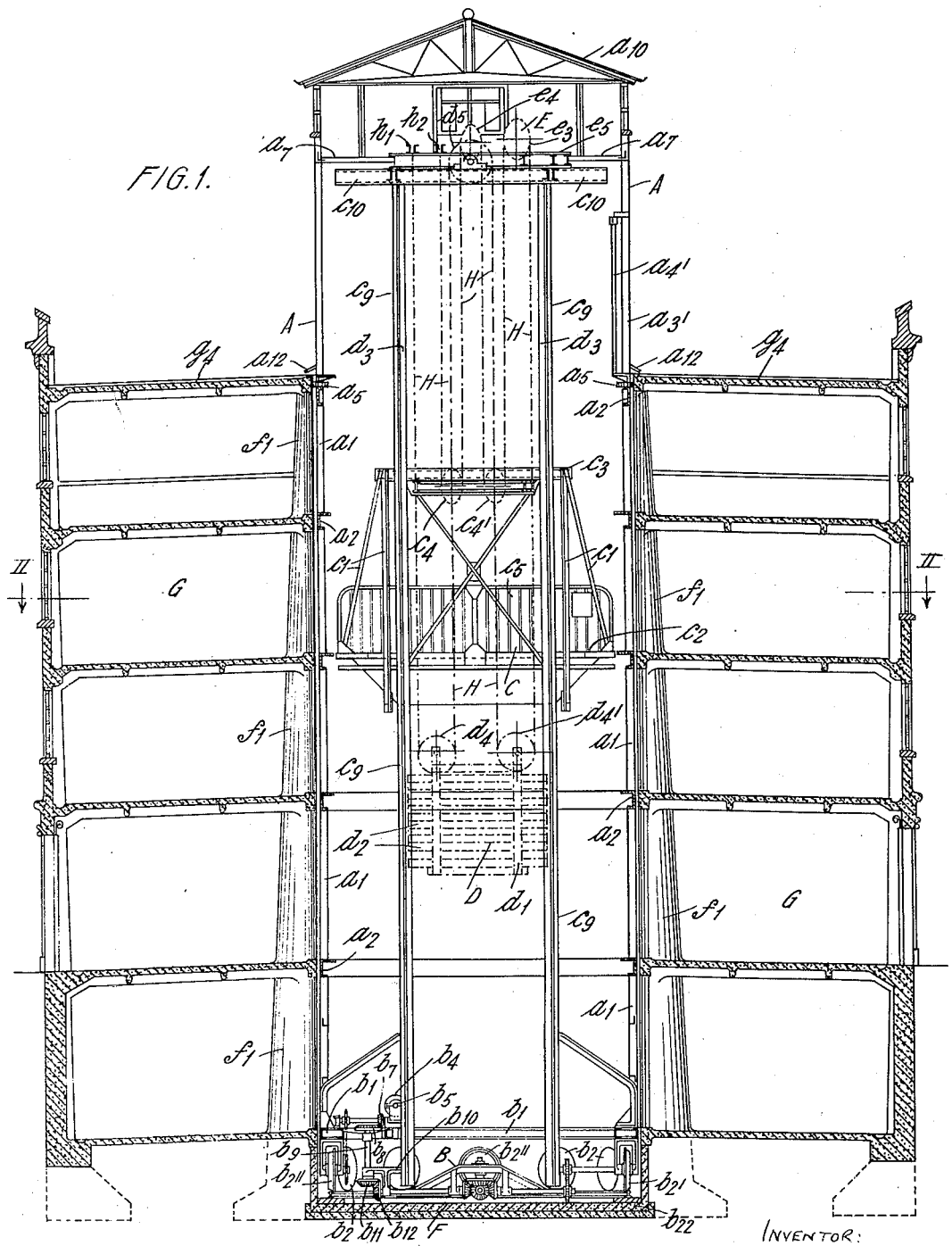
Fig. 1 is an elevation in medial section.

Fig. 9 showing a building circular in plan.

Fig. 10 a building, the length of which is substantially greater than its width; and Fig. 11 a building of L-shape configuration.

In the arrangement illustrated in Figs. 1 to 8 the elevator cage, the balance weight and the guides therefor are carried in a structure rotatable about a vertical axis preferably a casing of circular or polygonal configuration, which structure is located in a suitable well traversing the several floors of the building to be served by the elevator; the casing is provided with an opening at each floor level. At each floor there are formed in the well a series of circumferentially spaced openings, and the corresponding floor opening in the casing is adapted, by rotation of the casing, to be brought into alignment with any of the said openings on the same floor level.

Preferably the gear for operating the elevator is carried by the rotatable casing and is usually located at the top of the casing, and the arrangement of the casing, balance weight and operating gear may be conveniently described as a turn-elevator.

A is the casing, B the turn-table upon which the casing is rotatably supported, C the elevator cage, D the balance weight and E the cage operating gear. F is the well in which the casing is rotatably mounted; in the example illustrated the well is located in the centre of a building G which is a motor garage comprising five floors and a flat roof. Each floor is divided into eight sections by walls $g^1$ extending from the outer walls of the building to the lift well, an opening $g^3$ being provided in the lift well for each section, the said openings in the example illustrated being equally spaced round the lift well at each floor and being separated by vertical members $f^1$ of the well.

The frame work of the casing A is built up of vertical members $a^1$, of which, in the example illustrated, there may conveniently be eight; the lower ends of the members $a^1$ are connected to and supported by the rotatable carriage $b^1$ of the turn-table B. At each floor level the vertical members are connected together by circumferential members $a^2$, and the vertical members $a^1$ and circumferential members $a^2$ are tied together by suitable diagonal bracing; the cylindrical wall or shell of the casing is secured by the frame structure so formed, and has at each floor level an opening corresponding in width with the several openings $g^3$ in the well, said openings (of which one, $a^3$, Figs. 2 and 6, is shown) being closed by a collapsible gate $a^4$ or by a sliding door; the openings $a^3$ are usually in line vertically.

The casing A, as stated, is carried from the frame $b^1$ of the turn-table B, the frame $b^1$ in turn being supported on a series of radially disposed wheels $b^2$, $b^{2'}$, $b^{2''}$ carried in brackets $b^3$ secured to the turn-table frame $b^1$, of which brackets two only are shown in Fig. 4. The wheels $b^2$ run on a circular rail track $b^{20}$ supported on sleepers $b^{21}$ laid on the foundation $b^{22}$. Four of these wheels spaced at 90 degrees, namely the three wheels $b^{2'}$ (of which two only are shown in Fig. 4) and a wheel $b^{2''}$ are driven. A motor $b^4$ (see Fig. 6) is geared to the worm of a worm and worm-wheel, or other suitable speed reduction gear $b^5$, to the slow speed shaft $b^6$ of which is keyed a bevel pinion $b^7$ gearing with a bevel wheel $b^8$ mounted on the vertical shaft $b^9$, the lower end of which is carried in a bracket $b^{10}$ and has keyed to it a bevel pinion $b^{11}$ gearing with a bevel pinion $b^{12}$, keyed on a shaft $b^{13}$. The pinion $b^{14}$ on the shaft $b^{13}$ drives a centre bevel wheel $b^{15}$ which in turn drives the bevel wheels $b^{16}$ keyed to the respective shafts $b^{17}$ geared by spur gearing $b^{18}$ to the respective shafts $b^{19}$ on which the wheels $b^{2'}$ are mounted. The centre bevel wheel $b^{15}$ is carried on a vertical spindle $b^{23}$ which with the shafts $b^{13}$ and $b^{17}$ are carried in a framework $b^{24}$. In this way the bevel gear drives the three wheels $b^{2'}$, the remaining driven wheel $b^{2''}$ being driven by chain gearing $b^{25}$ from the shaft $b^6$. Thus when the motor $b^4$ is driven, the turn-table and the casing A are rotated about a vertical axis through any desired angle.

Figure 2:
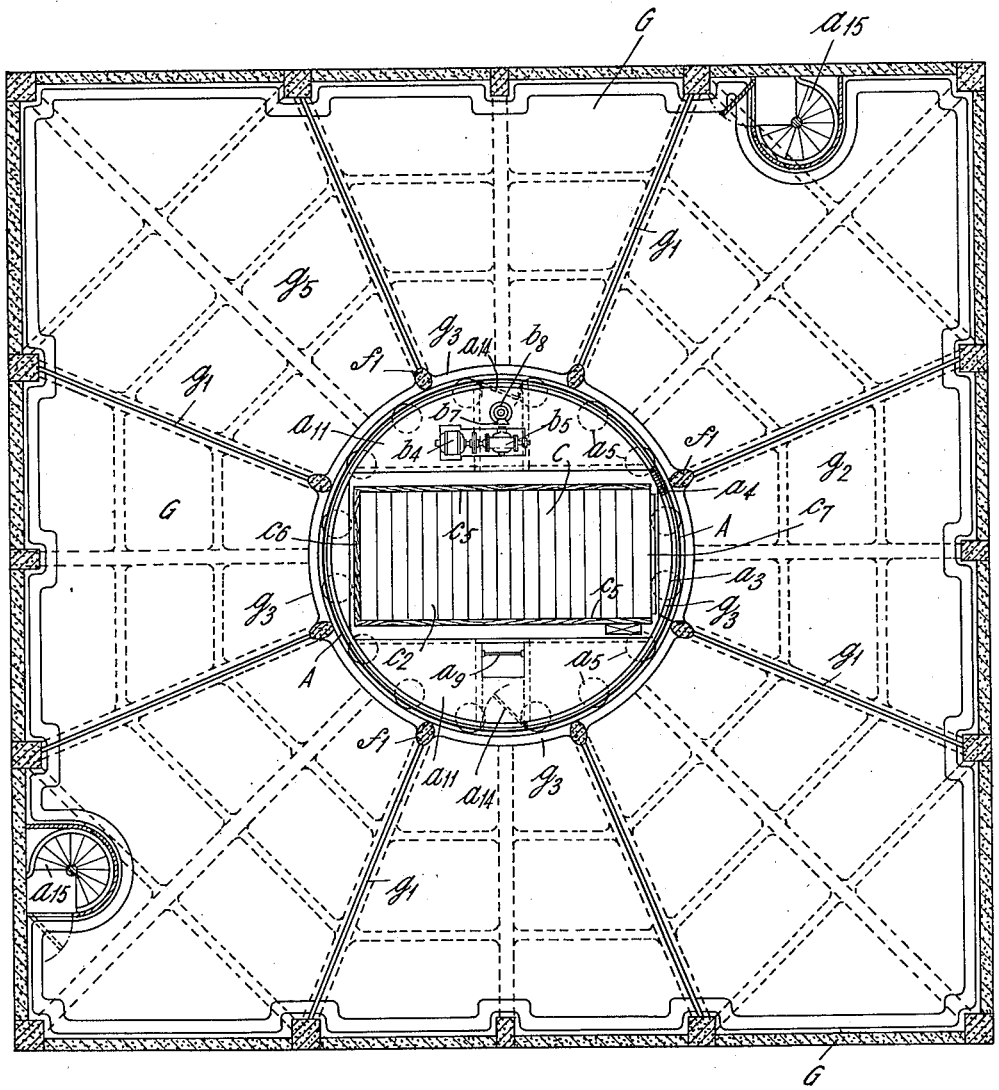
Fig. 2 is a plan in section on the line II, II of Fig. 1.
Figure 6:
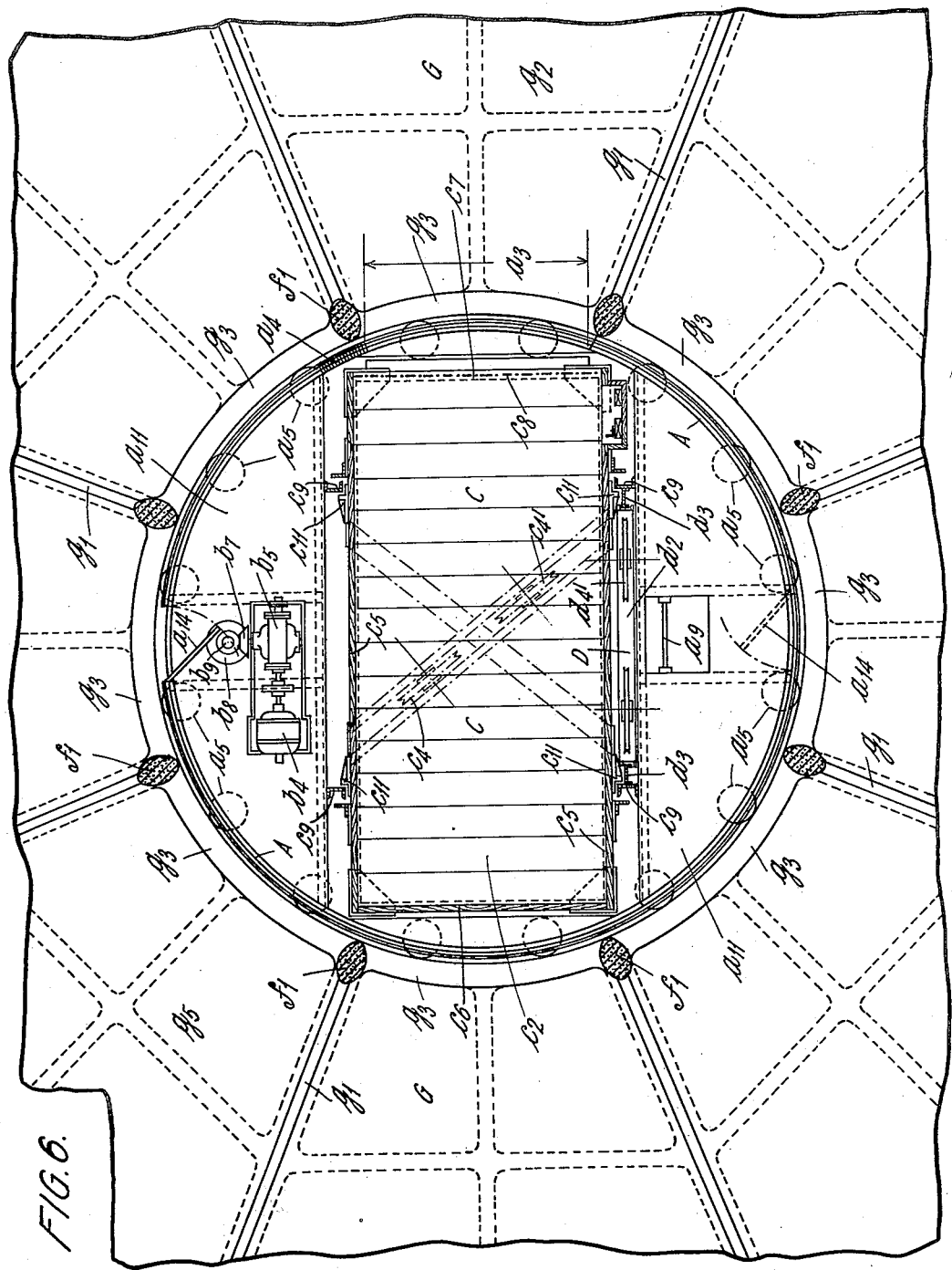
Fig. 6 is a plan view corresponding with the central portion of Fig. 2 to an enlarged scale.

The upper end of the casing A is provided with a series of rollers $a^5$ of which sixteen are shown in dotted lines in Figs. 2, 6 and 8. (These rollers are actually below the planes of section of Figs. 2 and 6, but for clearness they are shown by dotted lines). The rollers are arranged with their axes vertical and are carried in brackets $a^6$ bolted to the circumferential members $a^2$ of the framework of the casing. A circular race $f^2$ is provided round the inside of the well and in alignment with the rollers $a^5$. Normally the turn-table on which the casing is supported maintains the axis of the casing vertical, and the casing rollers are just clear of the well; if, however, there should be any tendency when a motor vehicle or the like is leaving or entering the elevator, or for any other reason, to deflect the axis of the casing from the vertical, such tendency is resisted by the rollers $a^5$ engaging the circular race $f^2$.

The casing A is carried beyond the roof so that the cage platform may be raised level with the top $g^4$ of the roof, an opening $a^{3'}$ fitted with a door $a^{4'}$ being provided in the casing and corresponding with the openings $a^3$ at the several floors.

The room in which the operating gear is located would usually be separated from the casing by a flooring $a^7$ (see Figs. 3 and 5), a suitable manhole $a^8$ and ladder $a^9$ being provided to give access to the enclosure which would be roofed over with a suitable roofing $a^{10}$. As it is only necessary to leave a rectangular clear way for the cage, segment-like flooring portions such as $a^{11}$ (see Figs. 2 and 6) may be provided lineable with the basement as shown, or lineable with any of the other floors if required; access doors such as $a^{14}$ (shown in dotted lines Fig. 2) would be provided.

A weather-tight joint is made between the casing at the top of the well by carrying projecting portions such as $a^{12}$ round the casing or by forming a groove such as $f^3$ Fig. 7 at the top of the well, and fitting the casing with a circumferential projection such as $a^{13}$.

The cage C may be of the open type and comprise any suitable framework $c^1$ by which a platform $c^2$ is suspended from a cross-beam $c^3$ from which the rope pulleys $c^4$, $c^{4'}$ are rotatably carried.

In the arrangement illustrated, which is intended for raising and lowering motor vehicles, the platform $c^2$ is made wide enough and long enough to accommodate vehicles of the usual dimensions, side walls $c^5$ and an end wall $c^6$ being provided. The end $c^7$ of the cage is open and may be brought into alignment with any one of the openings $a^3$ of the casing. If desired the open end $c^7$ of the cage may be provided with a collapsible gate $c^8$ of the usual type shown in dotted lines in Fig. 6. $c^9$ are the guides for the cage, of which there are four; at their lower ends these guides are secured to the bed of the turn-table B and at their upper ends they are secured to the crossbeam $c^{10}$ carried from the upper end of the framing of the casing A. The balance-weight D consists of a framework $d^1$ adapted to take a series of weights $d^2$ the ends of which are grooved so as to be guided by a pair of vertical guides $d^3$, the lower ends of which are fixed to the turn-table frame $b^1$, and the upper ends of which are fixed to the cross-beam $c^{10}$. The balance weight guides $d^3$ and the cage guides $c^9$ are strengthened by being connected together and to the casing at suitable intervals. The guide brackets $c^{11}$ fitted to the cage C engage with the casing guides $c^9$. The balance weight frame $d^1$ carries rotatable rope pulleys $d^4$ and $d^{4'}$.

The operating gear E (see Fig. 5) comprises an electro-motor $e^1$ geared to the high speed spindle of a speed reducing gear $e^2$, the slow speed shaft of which is keyed to the driving rope pulley $e^3$ which is located in line with the rope pulley $e^4$; the bearings of the rope pulleys, the motor, and the reducing gearings being carried on beams $e^5$ supported by the cross-beams $c^{10}$. A guide pulley $d^5$ is carried in suitable bearings supported on the beams $c^{10}$, and $d^6$ carried from the cross-beams $c^{11}$.

The rope H, by which the elevator is operated, and which is shown in chain dotted lines, is anchored at one end at $h^1$, then passes round the pulley $d^4$ on the balance-weight, then up and over the fixed pulley $d^5$, then down and round the pulley $d^{4\prime}$, then over the driving pulley $e^3$, then round the pulley $c^{4\prime}$ fixed to the cage, then up and round the fixed pulley $e^4$, then down and round the pulley $c^4$ fixed to the cage, and then to the anchoring point $h^2$.

Doors $a^{14}$ (Fig. 2) are provided, by which access is obtained to the segmental floors, and spiral staircases $a^{15}$, are arranged for use when the elevator is not working.

When the openings $a^3$ are closed by their respective gates $a^4$ or sliding doors, it will be seen that the wall or shell of the casing A and the said gates effectively close each of the forty openings $g^3$ in the well, thus rendering it unnecessary to fit these openings with forty gates or doors which would otherwise be required, thus effecting considerable saving in this respect in the case of a multi-chamber building.

The mode of operation is as follows:—

Assuming the building illustrated to be a garage having eight separate garage spaces on each floor suitable for garaging one large car or, say, two smaller cars; and assuming that on the lower floor the compartment below that marked $g^2$ in Figs. 2 and 6, is open to the road-way; and that the casing has been rotated until the cage is in the position shown in Fig. 2 with its platform in alignment with the ground floor;—the cage door $a^4$ would be opened, leaving a clear opening $a^3$ in the wall of the cage through which the vehicle would be driven on to the cage platform; if the vehicle had to be garaged in any of the chambers in alignment with the chamber $g^2$ (Fig. 2) the cage would be elevated to the desired level and the vehicle driven into appropriate garage space. If however the vehicle had to be garaged in the space $g^5$ on the fourth floor (Fig. 2) the cage would be raised to the level of the fourth floor and then rotated through 135 degrees; or, of course, the rotation may be effected by the operation of the motor $b^4$, whilst the cage was being elevated by the operation of the motor $e^1$.

Should it be required to garage the vehicle on the roof the cage would be raised to the roof level, the door $a^{4\prime}$ being opened so that the vehicle may be driven out through the opening $a^{3\prime}$. One opening $a^{3\prime}$ usually provides for the roof space, but of course two or four equally spaced such openings may be provided to facilitate garaging on the roof.

The reverse procedure is adopted when the vehicle has to be taken out of any garage space, in which case the cage is brought to the desired level, the cage turned so that the opening $a^3$ is in alignment with the desired opening $g^3$, the vehicle is backed into the cage and the cage lowered to the ground level, the opening $a^3$ brought opposite the roadway and the vehicle driven out.

In garage construction the arrangement described forms a unit structure and is suitable for a building having approximate equal rectangular dimensions, or for a circular building as shown in Fig. 9.

Where however one of the rectangular dimensions of a multi-floor building is substantially longer than the other as in Fig. 10 the central block G′ may be constructed as described with a turn elevator having a cage C and casing A, the latter being located in the central well, and the turn elevator operating substantially as described. Two wing blocks $G^2$, $G^3$, will be constructed substantially as described with reference to the block G Figs. 1 to 10, except that the floor of each is continuous, that is to say without any lift well, the space at each floor being divided by radial walls as described. In the wing block $G^2$ a turn-table $H^2$ of any suitable construction would be fitted at each floor level, and in the block $G^3$ similar turn-tables $H^3$ would be fitted. The space $g^6$ and $g^7$ of the central block on each floor would be used as corridors leading respectively through doors $g^8$ and $g^9$ and through the corridors $g^{10}$ and $g^{11}$ to the turn-tables $H^2$ and $H^3$ in the blocks $G^2$ and $G^3$ respectively.

The remaining spaces in each of the blocks would be available as garage spaces, and, assuming that the space on the ground floor in alignment with the space $g^{12}$ on the central block, leads to the roadway, it will be seen that a vehicle may be taken from the roadway into the cage of the turn-elevator, be then raised to the desired floor level, and then be garaged directly in any of the garage spaces on that floor in the central block G′; or, by traversing the corridor spaces, and be transferred on to either turn-table $H^2$ and $H^3$, and by rotation of $H^2$ or $H^3$, as the case may be, be garaged in the appropriate garage space in either of the blocks $G^2$ or $G^3$.

The structure of which the turn-elevator forms part is especially well adapted to be carried out in ferro-concrete, which provides an excellent fireproof structure; and it will be seen that each chamber is, from a firerisk point of view, isolated so that a fire originating in a chamber is confined to that chamber, which is a matter of considerable importance in view of the inflammable nature of motor cars carrying supplies of petrol.

The construction of turn-table, lift well and chambers described by way of example is particularly suitable for transporting motors or vehicles, but it is well adapted for similar transport articles or goods which require to be stored in separate chambers in different storeys, such for example as certain classes of furniture comprising several pieces, or for transporting grain-laden trucks or the like which may be adapted to run off the lift cage on to rails into chambers, or may be of the tipping type adapted to deliver their contents into appropriate chambers through chutes or the like; the arrangement is also applicable for transport by runways or monorails which would be arranged to radiate from the lift well, sections of such rails being carried by the lift cage. The turn-lift as described could also be used for carrying passengers where the exigencies of the circumstances necessitate, passengers being transported vertically to the various corridors located at different levels and opening into a common lift well.

Turn-lifts located in the open with the object of saving space would be employed in the transport of passengers in large buildings, the rotating casing being erected in, say, an area, and having bridge-like corridors radiating at the several floors to different sections of the building.

Turn-lifts are suitable for use on board ship especially for handling mail bags and baggage which require to be stowed in different holds.

The details of construction of the lift and casing, and of the building served by the turn-lift would be modified in accordance with the service required and the nature of the storage accommodation.

More than the one lift could be installed in the one rotating casing, and each cage may be open at both ends, and in some cases continuously moving transport devices carried on pulleys, the one side moving up and the other side moving down, may be substituted for the rising and falling lift cage.

Having now fully described my invention, I declare that what I claim, and desire to secure by Letters Patent, is:—

1. In combination;—a casing capable of angular movement about a vertical axis; a plurality of openings in the wall of the casing at different vertical heights; transporting means carried by the casing and adapted to transport vertically to any of the said openings; means for operating the transporting means; a plurality of fixed openings at each of the levels of the respective openings in the casing, said fixed openings being adapted to be closed by the casing; and means for imparting angular movement to the casing so that any opening in the wall of the fixed casing may be brought into alignment with any one of the fixed openings at the same level; substantially as described.

2. In combination;—a casing capable of angular movement about a vertical axis; a plurality of openings in the wall of the casing at different vertical heights; closing means for each of the said openings; transporting means carried by the casing and adapted to transport vertically to any of the said openings; means carried by the casing for operating the transporting means; a plurality of fixed openings at each of the levels of the respective openings in the casing, said fixed openings being adapted to be closed by the casing; and means for imparting angular movement to the casing so that any opening in the wall of the casing may be brought into alignment with any one of the fixed openings at the same level; substantially as described.

3. In combination;—a multiple floor building; a well extending through the floors of the said building; a structure capable of angular movement about its axis located within the well, and having a cylindrical casing provided with openings at the different floor levels; a plurality of openings in the well at each floor level adapted to be closed by the casing; means for rotating the casing; an elevator cage within the structure adapted to move longitudinally thereof on guides carried thereby; and means for raising and lowering the cage; substantially as described.

4. In combination;—a multiple floor building; a well extending through the floors of the said building; each floor of the building being divided into separate compartments; a fixed opening in the well for each compartment; a casing rotatably mounted on the said well, extending through the several floors and adapted to close the said fixed openings, said casing having an opening at each floor level, each casing opening, upon angular movement of the casing, being adapted to align with any one of the series of fixed openings corresponding with the particular floor level; means carried by the casing for rotating the casing through any required angle; an elevator cage adapted to move longitudinally in the casing on guides carried thereby; a balance-weight adapted to move longitudinally in the casing on guides carried thereby; a gearing located in the upper end of the casing for imparting motion to the elevator cage and balance-weight; substantially as described.

5. In combination;—a multiple floor building; a well extending through the floors of the said building; each floor of the building being divided into separate compartments; a fixed opening in the well for each compartment; a casing rotatably mounted in the said well, extending through the several floors and through the roof of the building and adapted to close the said fixed openings, said casing having an opening at each floor level and at the roof, each casing opening, upon angular movement of the casing, being adapted to align with any one of the series of fixed openings corresponding with the particular floor level; means carried by the said casing for rotating the said casing through any desired angle; an elevator cage adapted to move longitudinally in the casing on guides carried thereby; a balance-weight adapted to move longitudinally in the casing on guides carried thereby; and means located in the upper end of the casing for imparting motion to the elevator cage and balance-weight; substantially as described.

6. In combination;—a multiple floor building; openings in any desired number of consecutive floors of said building, said openings being in vertical alignment and forming a lift well; a substantially cylindrical casing rotatable about a vertical axis and passing through said openings and enclosing the lift well; a series of openings in the said casing corresponding with the different floor levels; transporting means carried by the casing and adapted to transport vertically to any of the casing openings; means for operating the transporting means; and means for imparting angular movement to the casing so that the casing openings on any floor may be turned into any desired angular position; substantially as described.

7. In combination;—a multiple floor building having a substantially flat roof; openings in the several floors and roof of the building in vertical alignment and forming a lift well; a substantially cylindrical casing rotatable about a vertical axis and extending through the openings at the several floor levels and the roof and enclosing the lift well; a series of openings in the casing at the respective floor and roof levels; transporting means carried by the casing and adapted to transport vertically to any of the casing openings; means for operating the transporting means; and means for imparting angular movement to the casing so that the casing openings may be rotated to any desired angular position; substantially as described.

8. In combination;—a multiple floor building; openings in any desired number of consecutive floors of said building, said openings being in vertical alignment and forming a lift well; a substantially cylindrical casing rotatable about a vertical axis and passing through said openings and enclosing the lift well; a series of openings in the said casing corresponding with the different floor levels; an elevator cage; guides carried by the casing so as to maintain the cage in alignment with the casing openings; means for raising and lowering the cage; and means for rotating the casing; substantially as described.

9. In combination;—a multiple floor building; openings in any desired number of consecutive floors of said building, said openings being in vertical alignment and forming a lift well; a substantially cylindrical casing rotatable about a vertical axis and passing through said openings and enclosing the lift well; a series of openings in the said casing corresponding with the different floor levels; a rectangular elevator cage; guides carried by the casing so as to maintain the cage in alignment with the casing openings; segmental strengthening floors carried from the inside of the casing, the inside edges of the said floors being parallel with but clear of the long side of the elevator cage; substantially as described.

10. In combination;—a multiple floor building; openings in any desired number of consecutive floors of said building, said openings being in vertical alignment and forming a lift well; a substantially cylindrical casing rotatable about a vertical axis and passing through said openings and enclosing the lift well; a series of openings in the said casing corresponding with the different floor levels; transporting means carried by the casing and adapted to transport vertically to any of the casing openings; means for operating the transporting means; means for rotating the casing; a circular race carried from one of the upper floors of the building and concentric with the axis of rotation of the casing; a series of circumferentially spaced rollers having vertical spindles journalled in bearings carried by the rotating casing, the rollers being adapted to roll on the said race to maintain the vertical alignment of the casing; substantially as described.

11. In combination; — a multiple floor building; openings in any desired number of consecutive floors of said building, said openings being in vertical alignment and forming a lift well; a substantially cylindrical casing rotatable about a vertical axis passing through said openings and enclosing the lift well; a series of openings in the said casing corresponding with the different floor levels; transporting means carried by the casing and adapted to transport vertically to any of the casing openings; means for operating the transporting means; a fixed circular track arranged below the casing; a series of circumferentially disposed wheels running on the said tracks and having radially disposed shafts journalled in bearings carried by the casing, the shafts of some of the wheels being geared by spur and bevelled gearing to a common centrally located bevel wheel; and power-operated means geared to the said central bevel wheel and adapted when operated to rotate the casing; substantially as described.

In witness whereof I have hereunto set my hand.

EUGÈNE CHAUDOIR.